CHARLES G. HEISIG
RICHARD L. MITCHELL
*INVENTORS*

Oct. 3, 1967  C. G. HEISIG ET AL  3,344,658
TEST CELL USING ACOUSTIC ENERGY
Filed Sept. 23, 1964  2 Sheets-Sheet 2
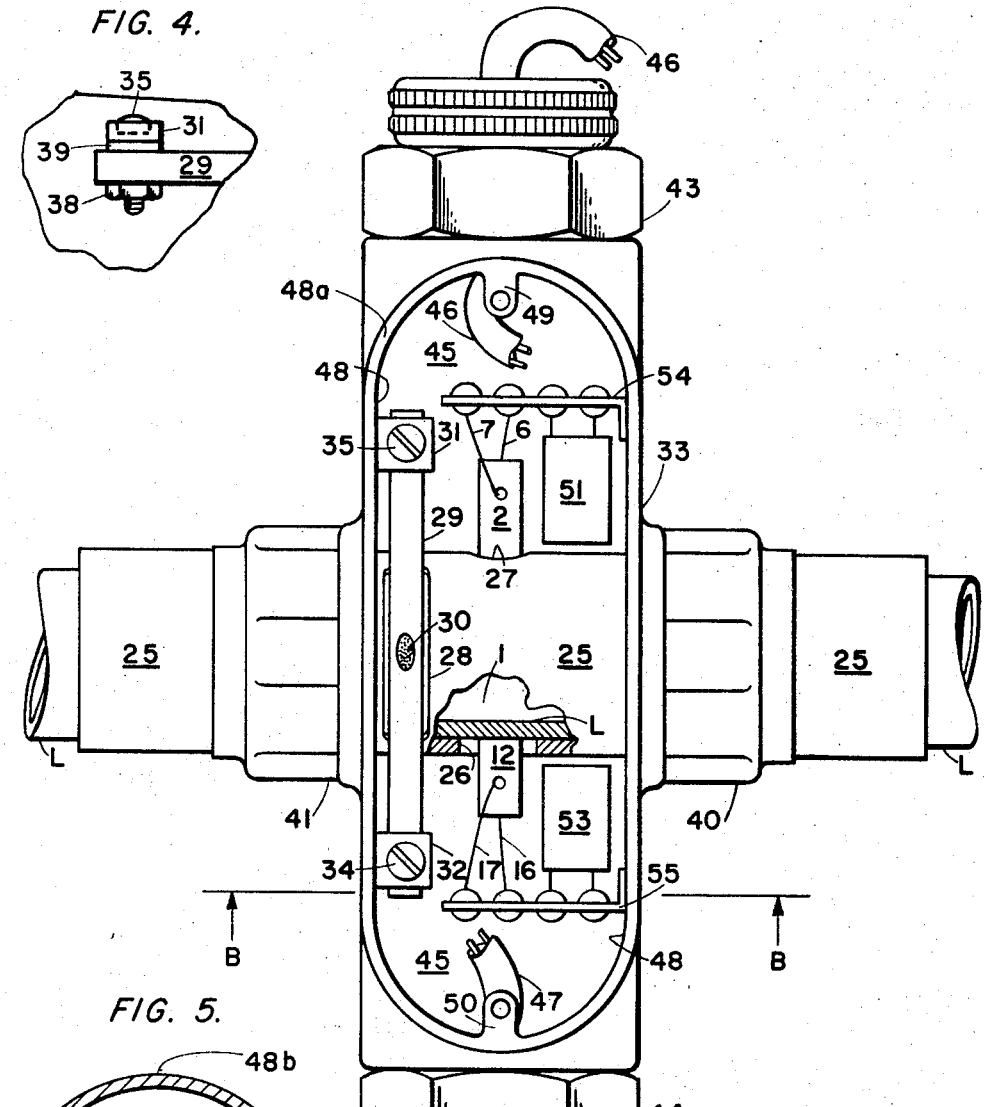
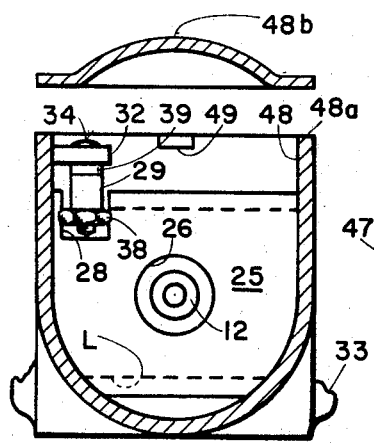
CHARLES G. HEISIG
RICHARD L. MITCHELL
INVENTORS United States Patent Office 3,344,658
Patented Oct. 3, 1967

3,344,658
TEST CELL USING ACOUSTIC ENERGY
Charles G. Heisig, Brighton, and Richard L. Mitchell, Rochester, N.Y., assignors to Taylor Instrument Companies, Rochester, N.Y., a corporation of New York
Filed Sept. 23, 1964, Ser. No. 398,561
17 Claims. (Cl. 73—53)

ABSTRACT OF THE DISCLOSURE

A test cell in the form of a section of pipe having electromechanical transducers fixed to the external surface thereof is provided with a mantle of plastic, or the like, enveloping its external surface. The mantle may be built up as layers of foam plastics alternating with layers of fiber-glass cloth. Again, the mantle may be a snug-fitting sheath of rubber or the like, which is in turn housed in a more or less rigid sealed housing. A rigid bar within the housing connects the housing to the pipe, the bar being welded to the pipe, and its ends being clamped to the housing by acoustic isolating means. In either case, the mantle damps the pipe section, isolates it from external mechanical influences, shortens the acoustically-active length of the space within the cell, and protectively houses the transducers. The built-up form of test cell is particularly intended for defining the cell as a section of an existing run of pipe without disturbing the pipe, and is particularly suited for irregular pipe shapes and environment locations. In the other form of test cell, pipe section, mantle, housing, transducers, etc., are particularly suited to form an integral assemblage, existing independently of any run of pipe, e.g., its use in an existing run of pipe involves interrupting the run and inserting the test cell as part thereof.

---

This invention relates to test cells of the general character described in our copending application for U.S. Letters Patent, S.N. 295,496, filed July 16, 1963, now U.S. Letters Patent No. 3,283,562 issued Nov. 8, 1966, and assigned to the assignee of the present invention.

Such test cells basically consist of a pair of acoustic wave energy transducing or vibratory elements and a length of pipe, wherein each element is mechanically coupled to the pipe such that if either vibrates, vibrations will be created in the pipe wall, or, if the pipe wall vibrates, vibrations will be created in the said elements.

Accordingly, if one element is caused to vibrate such that vibrations are created in the pipe wall, the other element will receive these vibrations in some degree. If the received vibrations are compared to the original vibrations, it is found that the relationship of the former to the latter depends on the character of the path the vibrations follow between the elements. In general, the properties of this path, insofar as they effect the vibrations, are held constant, or are otherwise dealt with to like effect except with regard to the properties of the path via material in the space circumscribed by the cavity wall, which space we term an "acoustic cavity" in the above-identified application.

It is desirable that such acoustic cavity be of limited extent, and that its dimensions be fixed and definite, insofar as the material it bounds influences transmission of vibrations from one said element to the other said element.

It is also desirable that the only vibrations received by the said other said element be only those originating in said one said element, and that in general external influences be prevented from affecting the vibratory characteristics of the basic cell.

Our invention provides novel expedients providing the several features characterized hereinabove as desirable, and it is the object of this invention to embody these expedients in cell housing structure which also serves the conventional purposes of protecting the basic cell from influences such as deleterious atmospheres, mechanical damage, and provides support and housing for instrumentalities of one sort and another that may, in actual examples, form part of the structural assembly including the housing and the basic cell.

Accordingly, the main object of this invention is to provide novel housing structure for test cells of the type described.

Other more specific objects of the invention will be apparent from the detailed description of the invention, infra, and the claims appended hereto.

In the drawings:

FIGURE 3 is a view of a test cell according to another form of the invention;

FIGURE 4 is a view of a detail of FIGURE 3; and

FIGURE 5 is a view of a portion of FIGURE 3 in a section taken on line B—B.

Figure 1:
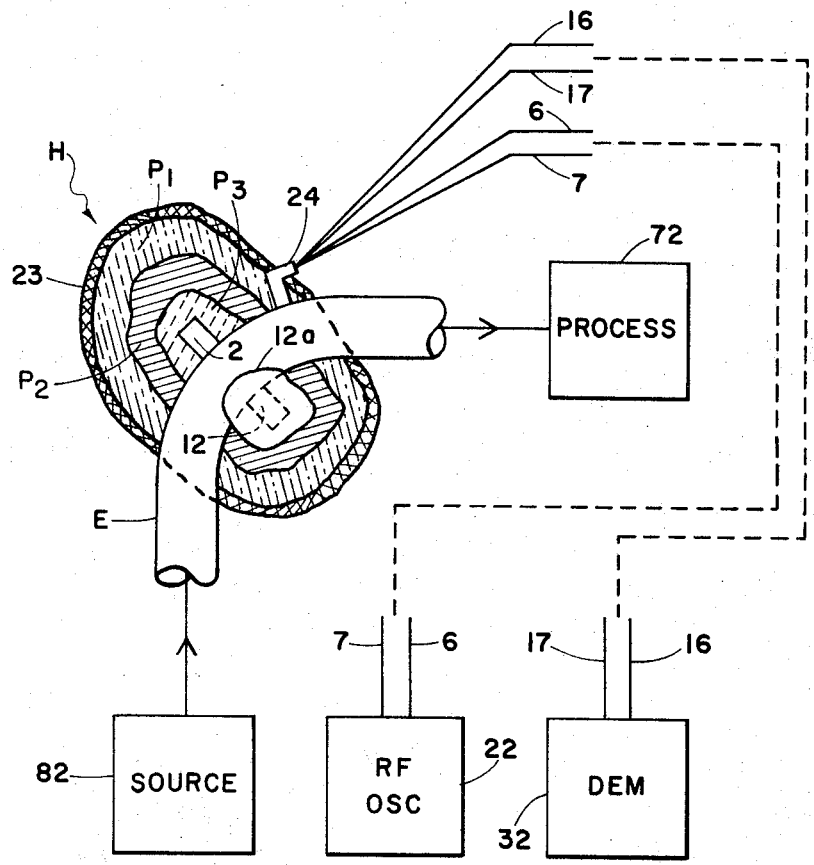
FIGURE 1 is a partly-sectional, partly-schematic view of a system including a test cell according to one form of the invention, the section being taken on line A—A of FIGURE 2.

FIGURE 1 represents a process environment incorporating testing or measuring means such as the bubble detecting system set forth and claimed in our above-identified copending application, said system being illustrated in FIGURE 6 thereof. System-wise, the system shown in FIGURE 1 represents nothing more than described either in the prior art or in said copending application. Thus the system of FIGURE 1 provides transducers 2 and 12, RF oscillator 22 and demodulator 32, along with such other instrumentalities (not shown) as may be needed to test for bubbles in liquid being used in process apparatus 72.

Process apparatus 72 receives liquid from liquid source 82, these two items being interconnected by a pipe (not shown) but including in its flow path a pipe section in the form of an elbow E, said transducers being coupled to said elbow and transmitting vibrations from one thereof to the other via the liquid in the acoustic cavity defined by the pipe wall immediately between the transducers. For further description of the principles affecting the system, reference may be had to the said copending application, whereas further description herein will be confined mainly to the housing provisions for the basic test cell. It will be realized that FIGURE 1 is illustrative of the essence of many systems wherein vibrations are applied to a liquid, or to a gas, to measure properties thereof such as density, flow rate, and so on. Hence, reference to bubble detection herein is merely by way of example, and we conceive the invention about to be described to be one of general utility apart from its present application to the bubble detection system.

Figure 2:
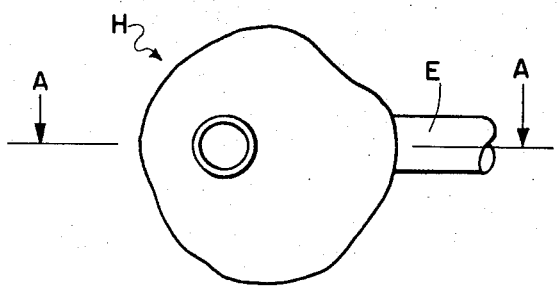
FIGURE 2 is another view of the test cell shown in FIGURE 1.

In FIGURE 1, the reference character H denotes an amorphous mass, mainly of "plastic," totally enveloping or mantling the transducers 2 and 12, and thus serving as a housing. FIGURE 2 represents the external appearance of the test cell as seen looking into one end of the elbow E.

The basic consideration for such type of housing is generally the possibility of housing the instrumentalities by what amounts in essence to merely covering them over with a non-solid substance which will subsequently harden or be caused to harden to a more or less durable mass. Thus, elbow E may be an existing element of the process environment, and it may be inconvenient or impossible to remove it in order to apply a housing. Obviously, however, it is possible to provide the housing H without disturbing either elbow E or the process activity.

The cross-section through housing H, FIGURE 1, is taken on a diameter of elbow E colinear with the longitudinal axes of transducers 2 and 12, and hence represents the test cell with about one half of the housing H cut away from the elbow. The section reveals that the housing H is built up on a layer principle.

Thus, housing H has an outermost integument 23, next a stratum of plastic $P_1$, then a stratum of plastic $P_2$, and finally a stratum of plastic $P_3$, next adjacent transducer 2. In this sort of housing, the different strata or layers are arranged in order of durability. That is, $P_3$ will be less durable than $P_2$, $P_2$ less durable than $P_1$ and $P_1$ less durable than the material of integument 23. In particular, integument 23 may be one or more layers of fiber-glass cloth, aggregated together with a suitable resin of good chemical stability, etc., whereas $P_1$, $P_2$ and $P_3$ may be so-called foam plastics, which are cellular substances of more or less solid nature of relatively low bulk density, and in general have good sound deadening properties.

According to the invention, the stratum of plastic $P_3$ contacts both the bare external surface of elbow 3 and the bare external surface of transducers 2 and 12. (Each of transducers 2 and 12 may be taken here to be axially-bored cylindrical elements, such as are disclosed in our above-identified copending application, the one end face of each thereof being cemented to the next-adjacent surface of elbow E, each element having a pair of leads (not shown) attached thereto, one such lead being soldered to a metallic plating on the outer cylindrical surface of the element and the other such lead being soldered to metallic plating on the inside of the bore of the element, and said leads being secured to a bracket or clamp 24 fixed to the elbow for connection as shown to the various conductors 6, 7, 16 and 17 leading to oscillator 22 and demodulator 32.)

The advantage of using foam plastic is manifold. To begin with, considering the stratum of $P_3$ to be a kind of form-fitting covering for one or both transducers, the raw material of the housing, namely an amorphous quantity of $P_3$, may be applied directly to the transducer or transducers, namely, such surface may be coated with a so-called "foam in place" material. One suitable material is urethane plastic which, though applied in substantially liquid form, subsequently foams up and hardens into a more or less rigid cellular mass covering and contacting substantially the entire external surface of the transducer and an area of pipe section surface surrounding the transducer.

In other words, the stratum of $P_3$, as housing, need not be fabricated beforehand to a particular contour. Furthermore, it may be applied with the test cell in place without interference from transducer leads, etc, or from adjacent structure. This is quite useful, of course, when the cell is located in cramped and/or relatively inaccessible quarters.

Next, the plastic $P_3$ can be chosen so as to have very good sound deadening properties, which means it will be acoustically dead in terms of the present disclosure, yet of sufficient low bulk density as not to acoustically load the transducer and pipe section surface appreciably. In other words, the transducers do not "know" that the plastic is there.

While the stratum of $P_3$ is the essence of the housing, the strata of $P_2$ and $P_1$ provide for greater structural durability. That is, if chosen for lightness and acoustic deadness, plastic $P_3$ may leave something to be desired as to its mechanical strength. Thus, $P_2$ would be chosen to be more stable, structurally than $P_3$, and $P_1$ chosen to be more stable than $P_2$. Along with increasing stability, generally speaking, there come increasing density and/or decreasing acoustic deadness. The strata of $P_2$ and $P_3$ may be emplaced, one after the other, in the same fashion as $P_1$, each stratum being allowed to foam up and set before another is emplaced thereon.

In practice, it is found that the graduation of plastic strata enables the amount $P_3$ to be reduced sufficiently that each transducer is encased in a separate blob or stratum of $P_3$ covering the transducer surface and the peripheral area of pipe section immediately surrounding the next adjacent end of the transducer. However, as it is possible to provide for a suitably-strong outer housing to enclose the plastic $P_3$, the present invention contemplates using but a single stratum of $P_3$. For example, since $P_3$ can be "foamed" in place, a simple form of about the volume of integument 23, and of no particular shape could be clamped around the pipe cell and $P_3$ introduced therein and allowed to foam up therein to fill the entire enclosed volume.

In the present instance, however, after $P_1$, $P_2$ and $P_3$ are emplaced, then, as a result of foaming or molding, an amorphous mass results from which project only the ends of the pipe section and the transducer leads (and possibly part of bracket 24). Hence, we find it more convenient to wrap the amorphous mass with fiber-glass cloth or tape, which is then saturated with a suitable resin that sets up into a hard non-porous crust or integument 23 having a matrix of interwoven fiber-glass strands.

Plastics of the sort envisaged herein are well known as to the requisite properties thereof, methods of handling and forming, and so on. Hence, we refer those skilled in the art to sources of information such as pages 340 through 373, 601, 602 and 603 of Modern Plastics, Encyclopedia Issue for 1961, September 1960, published by Plastics Catalogue Corp., Emmett St., Bristol, Conn.

The provision of $P_3$ simplifies greatly the task of encapsulating transducers 2 and 12. As foamed plastic $P_3$ adheres to or at least uniformly contacts the surfaces it covers, both test cell and housing form an integral structure having no parts, so to speak.

If damaged, the housing H can be readily patched up after the same fashion in which it was constructed, or can be readily renewed, all without interrupting the process or process apparatus.

Also, it will be seen that the housing H is applied with equal ease to any piece of pipe or equivalent, curved or not.

On the other hand, in numerous process environments, it is feasible to provide a test cell of the character shown in FIGURE 3, wherein the housing of the cell is quite differently conceived. Thus, the test cell, including housing structure may be manufactured as an item to be inserted in the process, such insertion involving interrupting the process apparatus where there is a straight run of pipe long enough to accommodate a test cell, the acoustic cavity of which is formed by a length of straight pipe or equivalent. Said length of straight pipe or equivalent may be either a part of the original run, or a new piece inserted in the original run or replacing a part thereof.

In FIGURE 3, the reference numeral 25 denotes a tubular, circularly-cylindrical sheath made of rubber, vinyl plastic, or other elastomer or elastomer-like substance having high acoustic damping properties. The inner diameter of sheath 25 is slightly smaller than the outer diameter of a pipe-section L, so that the former can be fitted tightly over the latter as illustrated.

Since it is desired to stretch sheath 25 over pipe-section L, sheath 25 is mounted on pipe-section L, prior to mounting transducers 2 and 12 on pipe-section L. For this purpose, a pair of holes 26 and 27 are provided on a diameter of sheath 25 coinciding with the axis of transducers 2 and 12, and somewhat larger in diameter than transducers 2 and 12 in order to provide easy access to pipe-section L in mounting the transducers on pipe-section L.

In addition, a slot 28 of sufficient width and circumferential extent to accommodate a rigid bar 29 in direct contact with pipe-section L, is also provided in sheath 25.

After the sheath 25 is fitted to pipe-section L, bar 29 is placed in the slot 28 and on pipe-section L, and is then welded as at 30 directly to the outer surface of pipe-section L, or is otherwise rigidly secured to and in direct contact with the outer surface of pipe-section L where the latter is exposed by slot 28. The form of the invention shown in FIGURE 3, of course, contemplates a pipe-section L of acoustically live material such as steel, since it is such liveness that creates the need for sheath 25.

The purpose of bar 29 is to securely fasten a pair of mounting lugs 31 and 32 of a housing 33 to pipe-section L, said legs being secured to the ends of bar 29 by means including screws 34 and 35, respectively passing through holes (not shown) in said lugs and said ends. As shown in FIGURES 3 and 4, a nut 38 is provided for drawing up screw 35, whereby to clamp lug 31 and the corresponding end of bar 29 together, there being provided a spacer 39 through which the shank of screw 35 passes, and which lies between the lug 31 and the corresponding end of bar 29. A like nut and spacer arrangement (not shown) is provided for screw 34, lug 32, and the other end of bar 29, for securing the last said lug and bar end together without the latter directly contacting each other.

Each said nut and each said screw is preferably made of nylon or other strong yet acoustically-dead substance, and each said spacer is of similar composition, Teflon, say, though no great strength is required in its case. Accordingly, the bar ends and lugs may be secured quite solidly together without establishing a good acoustic coupling between bar 29 and lugs 31 and 32. This permits the casing 33 being made of steel or other acoustically-live material having properties suitable for constructing a tightly-sealed, sturdy, protective housing, yet maintaining the acoustic cavity within pipe-section L isolated from external damping influences and vibrations.

As FIGURE 3 suggests, housing 33 is basically in the form of a cross having hollow arms terminating in glands 40, 41, 43 and 44, or like terminating devices that may be used to allow the ends of pipe-section L to project from the interior space 45 of housing 33, and to permit electrical cables 46 and 47 to do likewise, yet without permitting entry of gas, vapors or other substance into interior 45 via said glands. Thus, the glands 43 and 44 may be supposed to sealingly embrace the circumference of the respective cables 46 and 47. Likewise, glands 40 and 41 may be supposed to sealingly embrace the circumference of the respective ends of sheath 25. Since these expedients for sealing the entry and exit of pipes, cables, etc., into housings are well-known and their provision is within the ordinary skill of the artisan, no particular structure therefor is disclosed herein.

Housing interior 45, formed by the common merging of the arms of the cross-like housing shape, is provided with access opening 48. Said opening is bounded by a flat seating surface 48a and has tapped lugs 49 and 50, or the like, at either end thereof for securely fastening a sealing cover 48b (not shown in FIGURE 3, but of a form corresponding to said opening), over said opening and flat against seating surface 48a, as will be evident from FIGURE 5, in order to seal the interior 45 off from the environment external to said housing. In the form shown, housing 33, like sleeve 25, is emplaced before the transducers 2 and 12 are cemented to pipe-section L, hence opening 48 and the space 45 are proportioned to permit ready access, for the transducers, to holes 26 and 27 in sleeve 25.

FIGURE 5 shows the disposition of parts described supra as they would appear looking into space 45 from the location of gland 40. As FIGURES 3, 4 and 5 are dimensioned to substantially correspond in both scale and appearance to an actual example of the test cell depicted, FIGURE 5 needs no description other than to note that glands 40 and 41, the corresponding portions of sleeve 25 and pipe-section L, and electrical instrumentalities, such as leads 16 and 17, have been omitted from FIGURE 5.

Since it is often necessary or at least desirable to provide coupling devices, such as transformers, for efficiently connecting the electrical signals involved in the operation of transducers 2 and 12 to suitable electric circuitry (such as that including the oscillator 22 and demodulator 32), housing 33 may provide for housing such devices. Thus, speaking respectively, transformers 51 and 53 provide for coupling transducers 2 and 12 to oscillator 22 and demodulator 32. Terminal brackets 54 and 55, in turn, provide for supporting the respective transformers, and act as a support for solder terminals forming the several transducer-transformer interconnections and transformer-output or input cable connections, a few of which are evident from the FIGURE 3. However, the details of mechanical and electrical arrangement of connections are immaterial, provided that no acoustic coupling to transducers inheres therein. A shown for example, transformers 51 and 53, and terminal brackets 54 and 55, are more or less integral, in effect, with housing 33, whereas the sole connection of transducers 2 and 12 thereto, other than via sheath 25, is via the transducer leads 6, 7, 16 and 17, which may be thin and slack enough that practically no acoustic energy will be conducted thereby between transducers and terminal brackets. Obviously, other quite different types of housing structures might be used in connection with sheath 25, to the same effect as that illustrated, provided that acoustic isolation of housing from transducers 2 and 12 and pipe-section L be maintained.

Sheath 25 and/or housing 33 could be applied after securing transducers 2 and 12 and/or bar 29 to pipe-section L, if the sheath and/or housing were provided in split form. For example, sheath 25 could be split in two in a diametral plane and applied to the pipe-section L with the transducers 2 and 12, and bar 29 in place.

The respective housing provisions of FIGURES 1 and 2, and of FIGURES 3, 4, and 5, while in marked contrast as to material detail, nevertheless share a certain structural essence. Thus, the cross-shaped tubular housing 33 corresponds to integument 23, both of them being made of material that is more or less hard and more or less acoustically live, and both of them enveloping the functional elements of the test cell, so as to protect these from material contact from the external environment.

Again, both housing 33 and integument 23 are supported on the piece of pipe defining the acoustic cavity, and both are thus supported by means of acoustically-dead materials intervening between the former and the material of the pipe wall.

While the integument 23 may touch the elbow E where the latter emerges from the former, the contact is in a limited area and is not highly efficient (due to the disparities of the materials in contact and lack of clamping force to maintain the contact), and while the composite plastic mantle of integument 23 contacts the transducers as well as the housing, such disparities do not materially affect the described correspondence. It is to be noted that in order to seal off the interior of housing 33, nipples 40 and 41 clamp sheath 25 tightly enough that except for the intervention of sheath 25 between nipples and pipe-section L, the acoustic efficiency of the contact would be relatively high, especially were it a metal-to-metal contact. Again, the holes 26 and 27 are provided in sheath 25 for convenience in cementing transducers 2 and 12 in place, not for avoiding contact between sleeve 25 and said transducers. Though one would not want to entirely encapsulate the transducers 2 and 12 in a highly-damping material of the sort envisaged herein for sheath 25, some degree of contact between sheath 25 and the transducers would not adversely influence operation much. For example, such contact as could exist for the relative dimensions of sheath and transducers depicted in FIGURES 3 et al. would not be objectionable as to its loading effect on the transducers. In this connection it is interesting to note that the low acoustic loading imposed by $P_3$ on the transducers, makes $P_3$ the equivalent of holes 26 and 27, from one point of view, and the combination of $P_1$, $P_2$ and $P_3$ is like a sheath 25 the acoustic loading capability of which increases from its middle out to its ends.

The damping of pipe-section L is due to such loading, and is in proportion to how effectively the plastic material or materials are coupled mechanically to the pipe section. It is evident that neither $P_3$ nor slot 28 and holes 26 and 27 provide either much loading or good coupling. The amount of pipe-section surface exposed by such slot and holes may be somewhat more than suggested by the relative proportions indicated in the drawings. However, the more surface of pipe-section L in space 45 allowed to vibrate freely, the more the acoustically dead elements 34, 35, 38, 39, etc., must be depended on to isolate housing 33 from vibrations transmitted via weld 30 to bar 29. As the said elements by themselves do not offer substantial loading and are relatively rigid, their isolating effect is limited. Hence, there must be a substantial amount of sleeve 25 damping the pipe-section L in said housing 33 to limit the amount of vibration conducted into bar 29 via weld 30.

It may also be remarked here that acoustically "dead" simply signifies that the material so characterized simply does not transmit vibrations in the sonic-ultrasonic range well. Thus, due to their cellular form, resin foams, more or less approach the acoustic character of the air or other intracellular inclusions in the foam, and such vibration as is actually coupled to the resin elements is dissipated therein close to the point of coupling. The more substantial mantle 25, having no such inclusions, but a more extensive coupling to the pipe section, dissipates more vibration because more of the latter is coupled thereto by the pipe section. That is to say, the resin, vinyl, etc., to the extent that the mass thereof is coupled to the pipe-section, dissipates the vibration received relatively greatly, but transmits it poorly.

On the other hand, the pipe sections E and L, if made of metal, are acoustically "live," for as it is usually conceived, vibration is propagated therein by an elastic, collision-like process, involving low internal friction, as compared to the materials named herein as acoustically "dead."

In any event, the plastic, acoustically "dead" mantles formed by sheath 25 and by the composite of $P_1$, $P_2$ and $P_3$ have important functional effects. In what follows, these effects will be discussed in connection with sheath 25. It is to be understood, however, that the discussion applies as well to the composite of $P_1$, $P_2$ and $P_3$.

Sheath 25 per se has several useful properties, some of which are evident from the foregoing. Thus, if it is touched by the human hand, say, no change in the damping of pipe-section L occurs, and obviously it affords a very poor medium for coupling vibrations to pipe-section L.

In other words, though the housing 33 may contact some external object that either has a damping influence or is a source of vibrations, the housing cannot couple such damping or vibrations into the pipe-section L, since the housing itself is well-isolated from the pipe-section.

In addition, there results a beneficiation of the function of the type of test cell operation envisaged in our said copending application. Briefly, in said application it is contemplated that the transducer 2 be energized continuously at a frequency that is approximately that of the resonant frequency for the test cell under pulse-type energization of the transducer, for there will usually be a quite sharp, large-amplitude peak in the frequency response curve of the test cell within a narrow band of frequencies including said resonant frequency, when the cell is operated with continuous excitation of transducer 2. However, it is also disclosed that while there is in general a narrow frequency band containing such peak, a peak is not invariably found in the band contemplated supra, although the end result is approximately the same, insofar as bubble detection, or the like is concerned, for a similar peak can always be located in some other narrow band more or less remote from the first said band.

Nevertheless, it is preferable that the peak occur in the near vicinity of the pulse-operation resonant frequency, and, suprisingly, the plastic sheath 25 appears to assure that this will indeed be the case, for insofar as we are aware, where the test cell is provided with a plastic sheath, the desired peak is invariably found in the proper band, e.g., for example, in the band $f_{pp} \pm 5$ k.c., as disclosed in our said copending appleciation.

Another effect of sheath 25 (and housing H, of course,) is to reduce the active length of cavity 1, i.e., that length of fluid flow path in which a change in some acoustic parameter can significantly affect the output of transducer 12. This effect occurs even under continuous excitation of transducer 2. It is known that pulse-type of operation of the cell achieves the same effect, but at a considerable loss in sensitivity to such change as compared to the sensitivity thereto obtained by continuous excitation, as set forth for example, in our above-identified application. In this connection, it is to be noted that usually the ends of the cell are terminated more or less at the ends of the sheath, and, very often, tubing of flexible plastic, or the like, is used to connect the ends of the cell into a system, to help isolate the cell from vibrations in the system structure. Except for the plastic sheath on the cell, however, the active length of cell may extend several diameters of the pipe section into the connecting tubing. Hence, even if the latter is a good isolator, changing the position of the cell with respect to connecting tubing (as the connecting tubing of the flexible type readily permits) will be sensed by the measuring circuitry, unless the active-length of the cell is approximately the same as or less than its structural length.

In the foregoing, for illustrative purposes, we have chosen to illustrate the present invention as applied to the test cell described and claimed in our above-identified copending application, namely, to a test cell which is basically but a piece of pipe with the transducers cemented or otherwise held in direct contact with the outer wall of the pipe without such refinements of coupling such as the saddles, pipe flats, and so on provided in prior art cells on the suppositions such as that such expedients are needed to improve the coupling of the transducers to the pipe wall, etc. However, the various housing expedients disclosed herein may be applied to these and still other types of test cells, for in general, such test cells amount basically to a piece of pipe with one or more transducers mounted thereon, and are to one extent or another in need of vibrational or acoustic isolation and housing such as is provided by the present invention.

It will be apparent to one skilled in the art that our invention may be modified in various ways and/or put to numerous uses, too varied to set forth herein, without departing from the basic principles of the invention as set forth hereinabove and in the claims appended hereto. The detailed description herein, provided in compliance with the statutory provisions, is purely exemplary, and we do not intend that the scope of our invention be restricted save as required in the claims.

We claim:

1. A test cell comprising a tubular member of rigid material adapted to have material therein, and transducer means for transmitting vibrations into said material and receiving vibration transmitted through said material for determining a property of said material, said transducer means including a vibratable element; said tubular member having said vibratable element secured to the outer surface of said tubular member in such fashion as to provide for transfer of mechanical vibration between said vibratable element and material inside said tubular member; and a mantle substantially enveloping said tubular member and contacting substantially the entire surface thereof corresponding to the active length of said cell, the material of said mantle being acoustically dead, and loading said member so as to reduce the active length of said cell.

2. The test cell of claim 1, wherein said mantle is made of a material having the acoustic properties of elastomers and plastics such as rubber, vinyl and the like.

3. The test cell of claim 2, wherein said material is in the form of a tubular sheath substantially fitting said tubular member but being of slightly lesser dimensions, whereby said mantle grips said tubular member tightly.

4. The test cell of claim 1, wherein said mantle is made of material having the acoustic properties of foam resin, there being foam resin contacting the said vibratable element and said tubular member, such contact being over substantially all the surface of said vibratable element that is exposed when said element is secured to said tubular member.

5. The test cell of claim 4, wherein said tubular member is in the form of an elbow, said mantle enveloping a non-straight portion of said elbow and said vibratable element being mounted on such non-straight portion.

6. The test cell of claim 1, wherein said tubular member is an acoustically-live body, and has a rigid means fixed rigidly thereto and projecting therefrom; there being a housing enclosing said tubular member, and there being acoustically dead means fixing said housing to said rigid means and intervening between said housing and said rigid means to acoustically isolate the former from the latter.

7. The test cell of claim 6, wherein the said housing surrounds said pipe section, said vibratable element and said acoustically dead means.

8. In the combination of acoustic wave energy transducing means and a pipe-section of rigid material, said acoustic wave energy transducing means being arranged to respectively create acoustic wave energy in material in said pipe-section, and to sense acoustic wave energy in said material in said pipe-section for determining a property of said material, the improvement comprising a mantle enveloping substantially the entire exterior surface of said pipe-section corresponding to the active length thereof, said mantle contacting substantially the entire said surface; said mantle being made of acoustically dead material and loading said pipe-section such as to reduce said active length.

9. The combination of claim 8, including a housing enclosing said transducing means, and means for mounting said housing, the last said means including a rigid member integrally secured to said pipe section and projecting therefrom, and there being acoustically dead means securing said housing to said rigid member and intervening therebetween to provide an integral, acoustically dead connection between said housing and said rigid member.

10. The combination of claim 9, wherein the said housing surrounds said pipe section, said acoustic wave energy transducing means and said acoustically dead material.

11. The combination of claim 8, wherein said mantle is made of a material having the acoustic properties of elastomers and plastics such as rubber, vinyl and the like.

12. The combination of claim 11, wherein said mantle is in the form of a tubular sheath substantially fitting said pipe section but being of slightly lesser dimensions, whereby said mantle grips said tubular member tightly.

13. The combination of claim 8, wherein said mantle is made of a material having the acoustic properties of foam resin, there being foam resin contacting said acoustic wave energy transducing means and said pipe section, such contact being over substantially all the surface of said acoustic wave energy transducing means that is exposed when the last said means is secured to said pipe section.

14. The combination of claim 13, wherein said pipe section is in the form of an elbow, said mantle enveloping a non-straight portion of said elbow, and said acoustic wave energy transducing means being mounted on said non-straight portion.

15. A test cell having transducer means for transmitting vibration into material in said cell and receiving vibration transmitted through said material for determining a property of said material, said test cell comprising a pipe section, an acoustically dead sheath enveloping said pipe-section and snugly contacting substantially the entire external surface of said pipe section corresponding to the active length of said pipe-section, said transducer means including a transducer element having a vibratable surface in effective contact with said external surface and said transducer element projecting through said sheath; a casing element substantially enveloping at least the intermediate portion of said sheath and said transducer element, and being spaced therefrom; the ends of said casing element being provided with glands sealingly clamping the ends of said casing element to and around said sheath, a rigid member projecting from said pipe-section through said sheath into the space between said sheath and said casing element, and means securing said casing element to said rigid member, said means being acoustically dead and providing a clamping force urging said casing element and said rigid member together, there being a portion of said means intervening between said casing element and said rigid member and being clamped therebetween under the urging of said clamping force, whereby said pipe-section and said casing element are maintained in fixed relation to each other without there being direct contact therebetween.

16. The test cell of claim 15, wherein said means is essentially composed of acoustically dead material.

17. The test cell of claim 16, wherein said rigid member is a rigid bar rigidly secured intermediate its ends to said pipe section, the arrangement being that the length of said bar runs transverse to the length of said pipe section, and said means being provided between each of the last said ends and said casing element.

References Cited

UNITED STATES PATENTS

| | | | |
|---|---|---|---|
| 2,573,390 | 10/1951 | Blanchard | 73—67.5 |
| 3,144,762 | 8/1964 | Testerman et al. | 73—24 X |
| 3,204,458 | 9/1965 | Gillen | 73—194 |
| 3,218,852 | 11/1965 | Scarpa et al. | 73—194 |

JAMES J. GILL, *Acting Primary Examiner.*

JOHN P. BEAUCHAMP, JR., *Examiner.*